United States Patent
Hasan et al.

(10) Patent No.: US 11,654,005 B2
(45) Date of Patent: *May 23, 2023

(54) METHODS OF THREE-DIMENSIONAL PRINTING FOR FABRICATING A DENTAL APPLIANCE

(71) Applicant: DENTSPLY SIRONA Inc., York, PA (US)

(72) Inventors: Md Abu Hasan, York, PA (US); Dan Ammon, York, PA (US)

(73) Assignee: DENTSPLY SIRONA INC., York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/088,643

(22) Filed: Nov. 4, 2020

(65) Prior Publication Data

US 2021/0113313 A1   Apr. 22, 2021

Related U.S. Application Data

(63) Continuation of application No. 16/402,440, filed on May 3, 2019, now Pat. No. 10,856,957.

(60) Provisional application No. 62/666,396, filed on May 3, 2018.

(51) Int. Cl.
*A61C 13/00* (2006.01)
*A61C 9/00* (2006.01)
*A61C 13/08* (2006.01)
*B33Y 80/00* (2015.01)

(52) U.S. Cl.
CPC ........ *A61C 13/0019* (2013.01); *A61C 9/0053* (2013.01); *A61C 13/0004* (2013.01); *A61C 13/0013* (2013.01); *A61C 13/0018* (2013.01); *A61C 13/08* (2013.01); *B33Y 80/00* (2014.12)

(58) Field of Classification Search
CPC .............. A61C 13/0019; A61C 9/0053; A61C 13/0004; A61C 13/0013; A61C 13/0018; A61C 13/08; A61C 13/01; B33Y 80/00; B33Y 50/02; B33Y 10/00; B29C 64/393; B29C 64/40; B29C 64/124
See application file for complete search history.

(56) References Cited

U.S. PATENT DOCUMENTS

| | | | |
|---|---|---|---|
| 2012/0179281 A1* | 7/2012 | Steingart | A61C 13/0004 700/97 |
| 2012/0258430 A1* | 10/2012 | Ruppert | A61C 13/10 433/199.1 |
| 2018/0042705 A1* | 2/2018 | Howe | A61C 13/0022 |
| 2019/0167394 A1* | 6/2019 | Jakson | A61C 13/097 |

* cited by examiner

*Primary Examiner* — Charles R Kasenge
(74) *Attorney, Agent, or Firm* — Dentsply Sirona Inc.

(57) ABSTRACT

The invention relates to methods for preparing a three-dimensional digital model of a prosthetic denture base for fabrication using a light-based three-dimensional printing apparatus. A virtual reference model of a prosthetic denture base is prepared and manipulated to establish specific spatial orientation and angular inclination with respect to the build platform surface of the printing apparatus. Methods may include performing a corrective digital scaling process on the virtual reference model in order to achieve further improvements to dimensional accuracy in the fabrication of prosthetic denture bases.

12 Claims, 7 Drawing Sheets

METHODS OF THREE-DIMENSIONAL PRINTING FOR FABRICATING A DENTAL APPLIANCE

CROSS-REFERENCE TO RELATED APPLICATIONS

This patent application is a continuation of U.S. patent application Ser. No. 16/402,440, filed May 3, 2019, which claims the benefit of and priority to U.S. Provisional Patent Application Ser. No. 62/666,396, filed May 3, 2018, each of which is herein incorporated by reference for all purposes.

FIELD OF THE INVENTION

The present invention relates to methods for three-dimensional (3D) printing (also known as additive manufacturing) of a dental appliance. More particularly, the invention relates to methods for preparing three-dimensional digital models for fabrication of at least one prosthetic denture base using a liquid photopolymerizable composition with a light-based 3D printing apparatus.

BACKGROUND

In the field of 3D printing, obtaining printed objects having good dimensional accuracy, consistent surface features, and sufficient resolution of surface texture or smoothness in relation to the intended digital design are among the key challenges encountered when using a 3D printing apparatus to fabricate objects possessing complex surface geometry or intricate features. Historically, both standard SLA printers and DLP-SLA printers are generally regarded as having the best capability for providing the highest print quality characteristics, such as accuracy, resolution, and surface finish for printed objects. These print quality characteristics can be influenced by many commonly known factors in the printing apparatus (e.g., quality and resolution of the light source or optics used), as well as selection of basic printing process conditions or parameters (e.g., slice or layer thickness, and exposure time for photocuring). However, in the field of printing dental prosthetics, it has not been well-appreciated or understood that orientation of a prosthetic denture base in relation to the 3D build platform also can be among the key factors influencing final print quality characteristics that can be obtained for a printed denture base. Depending on the angular and positional placement established for a denture base in relation to the 3D build platform, dimensional deviations in the printed denture base (when compared to the digital model of the as-intended design) can range from limited, minor surface distortions to extensive, major changes in overall size or even shape due to warping of the object. Such major changes in size or shape may, at least in part, result from the effects of gravitational forces on different areas of the denture base during initial formation and curing of the structure. Increasing or improving the size, number, or location of removable support structures created during the printing process can help mitigate some of these dimensional accuracy issues. However, for most angular and positional placements of a denture base, the size, frequency, or location of support structure attachment points to the denture base results in trade-offs to the quality of surface finish and/or integrity of fit achieved on the teeth-pockets facing side, the teeth-pockets themselves, and/or the tissue-facing side of the printed denture base.

For the foregoing reasons, there is a need for improved methods of utilizing a light-based 3D printing apparatus with a liquid photopolymerizable composition to produce denture bases possessing both improved dimensional accuracy and outstanding surface finish characteristics consistent with the nominal, as-intended geometry, features, and size of the digital computer-aided design model information provided to a light-based 3D printing apparatus.

SUMMARY

The present invention is directed to methods of fabricating prosthetic denture bases, using a light-based three-dimensional printing apparatus, that satisfies these and other needs. The three-dimensional printing apparatus may utilize any light-based photocuring techniques, such as laser-based stereolithography (laser SLA), digital light processing stereolithography (DLP-SLA), or masked stereolithography (MSLA). More recent advances in continuous printing processes, such as so-called Continuous Digital Light Manufacturing (cDLM) and Continuous Liquid Interface Production (CLIP) processes, may be particularly useful with methods of the present invention.

Methods according to the invention for fabricating at least one prosthetic denture base using a light-based three-dimensional printing apparatus may comprise the steps of: (a) preparing, in computer-aided design software, a virtual reference model of a prosthetic denture base, wherein the process of preparing a virtual reference model of a prosthetic denture base comprises the steps of (i) selecting a three-dimensional digital model of a prosthetic denture base, the three-dimensional digital model of a prosthetic denture base comprising a teeth-pockets facing side, a tissue facing side on the opposing side of the teeth-pockets facing side, and a denture border extending around the peripheral edge of the prosthetic denture base, forming a boundary between the teeth-pockets facing side and tissue facing side; (ii) manipulating spatial orientation of the three-dimensional digital model of a prosthetic denture base to place the prosthetic denture base in a substantially horizontal position, wherein the teeth-pockets facing side is disposed either in an upward facing orientation or a downward facing orientation; (iii) applying a minimum bounding box encompassing the three-dimensional digital model of a prosthetic denture base; (iv) assigning a reference three-dimensional Cartesian coordinate (x-y-z) system to the three-dimensional digital model of a prosthetic denture base within the minimum bounding box, wherein the reference three-dimensional Cartesian coordinate system is aligned with the perimeter of the minimum bounding box, and further wherein an orienting reference plane is aligned with the base edge of the minimum bounding box; and (v) removing the minimum bounding box; (b) preparing, in software of a computer system in operative control of a light-based three-dimensional printing apparatus, the virtual reference model and a three-dimensional digital model of at least one removable support structure for printing, wherein the process of preparing the virtual reference model and three-dimensional digital model of at least one removable support structure for printing comprises the steps of: (i) positioning the virtual reference model adjacent to a virtual build platform surface provided by the software, wherein the tissue facing side of the virtual reference model is placed proximal to the virtual build platform surface; (ii) manipulating spatial orientation of the virtual reference model, wherein the orienting reference plane of the virtual reference model is arranged at an inclination angle between about 65 degrees to about 80 degrees relative to the virtual build platform surface, with anterior teeth-pockets proximal to the virtual build platform surface and posterior teeth-pockets distal to the virtual build platform surface; and (iii) generating a three-dimensional digital model of at least one removable support structure, connecting the virtual reference model to the virtual build platform surface; (c) providing a reservoir of liquid photopolymerizable composition in contact with a build platform surface of the light-based three-dimensional printing apparatus; (d) selecting, in software of the computer system in operative control of the light-based three-dimensional printing apparatus, printing process parameters to effectively photocure the liquid photopolymerizable composition in accordance with the virtual reference model and three-dimensional digital model of at least one removable support structure; and (e) instructing the light-based three-dimensional printing apparatus to print at least one prosthetic denture base and removable support structure from the liquid photopolymerizable composition.

In a further aspect of the invention, the process of generating a three-dimensional digital model of at least one removable support structure may comprise the steps of setting removable support structure contact points on areas of the teeth-pockets facing side and denture border of the virtual reference model, and excluding, or substantially excluding, removable support structure contact points from areas on the tissue facing side and within teeth-pockets of the virtual reference model.

In an embodiment, methods of fabricating prosthetic denture bases may further comprise the step of removing the at least one printed removable support structure from the build platform surface and the at least one printed prosthetic denture base following completion of printing.

In another embodiment, methods of fabricating prosthetic denture bases may further comprise the step of performing a post-printing wash treatment on the printed prosthetic denture base using a solvent composition.

In another embodiment, methods of fabricating prosthetic denture bases may further comprise the step of performing a secondary curing treatment on the printed prosthetic denture base.

In still another embodiment, methods of fabricating prosthetic denture bases may further comprise the step of performing a corrective digital scaling process on the virtual reference model to fabricate at least one prosthetic denture base.

BRIEF DESCRIPTION OF THE DRAWINGS

These and other features, aspects, exemplary embodiments, and advantages of the present invention will become better understood with regard to the following description, appended claims, and accompanying drawings where:

DETAILED DESCRIPTION

Figure 1A:
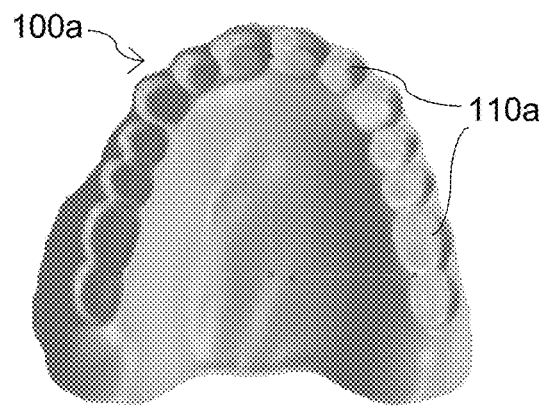
FIG. 1A shows a top view onto the "teeth-pockets facing side" of a three-dimensional (3D) digital model of an upper (maxillary) prosthetic denture base.

In the Summary above, and in the Detailed Description and Claims presented below, along with the accompanying drawings, reference is made to particular features and embodiments of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The following additional definitions shall apply throughout the specification and claims of the invention, unless specifically indicated otherwise.

The term "about" is used herein as a term of approximation to mean plus or minus 5 percent of the specified value, preferably plus or minus 3 percent of the specified value, more preferably plus or minus 1 percent of the specified value.

The terms "essentially" and "substantially" are used herein as terms of approximation to denote in large part, but not necessarily wholly or perfectly, in relation to the fundamental nature or predominant characteristic being described.

The term "at least" followed by a number is used herein to denote the start of a range beginning with that number (which may be a range having an upper limit or no upper limit, depending on the variable being defined). For example, "at least 1" means 1 or more than 1.

The terms "at most" or "no more than" followed by a number is used herein to denote the end of a range ending with that number (which may be a range having 1 or 0 as its lower limit, or a range having no lower limit, depending upon the variable being defined). For example, "at most 100" or "no more than 100" means 100 or less than 100. When, in this specification, a range is given as "(a first number) to (a second number)" or "(a first number)-(a second number)," this means a range whose lower limit is the first number and whose upper limit is the second number. For example, 1 to 5 mm means a range whose lower limit is 1 mm, and whose upper limit is 5 mm.

The term "and/or," as used herein, includes any and all possible combinations of one or more of the associated listed items, as well as the lack of combination when interpreted in the alternative ("or"). For example, "A and/or B" means A alone, B alone, or A and B together or mixtures thereof.

Directional or spatially relative terms, such as "under," "below," "beneath," "lower," "over," "upper," "above," "on top," "left," "right," and the like, may be used herein for ease of description to describe the relationship of an element or feature to other element(s) or feature(s) Illustrated in the figures. It will be understood that the spatially relative terms are intended to encompass different orientations of the device in addition to the orientations depicted in the figures. For example, if the device in the figures were to be inverted, elements or features described as "above" or "on top" other elements or features would then be oriented "below" or "under" the other elements or features. The device may be otherwise oriented (e.g., rotated at 90 degrees or other orientations) and the spatially relative descriptors used herein interpreted accordingly. Similarly, the terms "upward," "downward," "vertical," "horizontal" and the like are used herein for the purpose of relative explanation only, unless specifically indicated otherwise.

The term "tissue facing side" is used herein to denote the inner facing side of a prosthetic denture base that rests or sets upon the gingiva (gums) covering the maxillary and/or mandibular alveolar process. It may also be referred to as the intaglio surface or intaglio side.

The term "teeth-pockets facing side" is used herein to denote the outer facing side of a prosthetic denture base that is the obverse or opposing side of the "tissue facing side." It may also be referred to as the cameo surface or cameo side.

The term "denture border" is used herein to denote the boundary or margin at the junction between the tissue facing side (intaglio surface) and teeth-pockets facing side (cameo surface) that extends around the peripheral edge of a prosthetic denture base.

The term "minimum bounding box" (also sometimes known as a minimum bounding rectangle) is used herein to denote a rectangular border around a digital image, shape, or text that fully encloses a digital image. It is an expression of the maximum extents of an object (or set of objects) within its 2D or 3D coordinate system. It is the smallest area or volume within which all the points of an object (or set of objects) lie.

Descriptions presented herein provide explanations and illustrative examples of improved fabrication methods for 3D printing a prosthetic denture base. Methods of fabricating at least one prosthetic denture base according to one or more embodiments of the invention may comprise the steps of: preparing, in computer-aided design software, a virtual reference model of a prosthetic denture base; preparing, in software of a computer system in operative control of a light-based three-dimensional printing apparatus, the virtual reference model and a three-dimensional digital model of at least one removable support structure for printing; providing a reservoir of liquid photopolymerizable composition in contact with a build platform surface of the light-based three-dimensional printing apparatus; selecting, in software of the computer system in operative control of the light-based three-dimensional printing apparatus, printing process parameters to effectively photocure the liquid photopolymerizable composition in accordance with the virtual reference model and the three-dimensional digital model of at least one removable support structure; and instructing the light-based three-dimensional printing apparatus to print at least one prosthetic denture base and at least one removable support structure from the liquid photopolymerizable composition.

Methods of fabricating prosthetic denture bases according to one embodiment of the invention may further comprise the step of removing the at least one printed removable support structure from the build platform surface and the at least one printed prosthetic denture base following completion of printing. In another embodiment, methods of fabricating prosthetic denture bases may further comprise the step of performing a post-printing wash treatment on the printed prosthetic denture base using a solvent composition. In another embodiment, methods of fabricating prosthetic denture bases may further comprise the step of performing a secondary curing treatment on the printed prosthetic denture base.

In still another embodiment, methods of fabricating prosthetic denture bases may further comprise the step of performing a corrective digital scaling process on the virtual reference model to fabricate at least one prosthetic denture base.

Preparing Virtual Reference Model of Prosthetic Denture Base

In an embodiment of the invention, a "virtual reference model" of a prosthetic denture base may be prepared, within computer-aided design (CAD) software, from a three-dimensional (3D) digital model of a prosthetic denture base. The 3D digital model of a prosthetic denture base may be generated based on data from a high-resolution 3D scan of a dental impression taken from a patient's mouth, from a high-resolution 3D scan taken directly of a patient's mouth (e.g., using an intra-oral scanning device), from a denture base related computer-aided design, and combinations thereof. High-resolution 3D scans may be obtained, for example, by way of laser optical scanners, computed tomography (CT) Imaging, magnetic resonance imaging (MRI), or similar 3D imaging technologies known in the art.

Figure 1B:
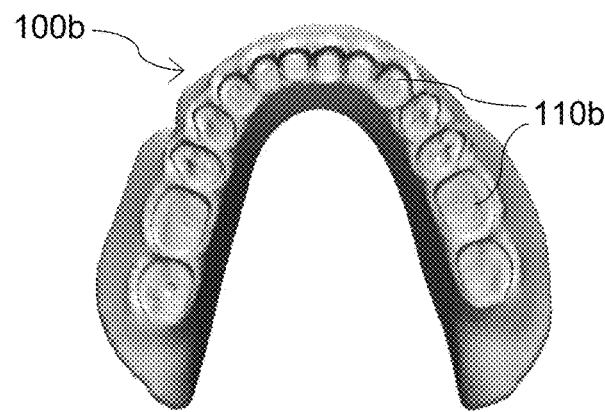
FIG. 1B shows a top view onto the teeth-pockets facing side of a three-dimensional (3D) digital model of a lower (mandibular) prosthetic denture base.
Figure 2A:
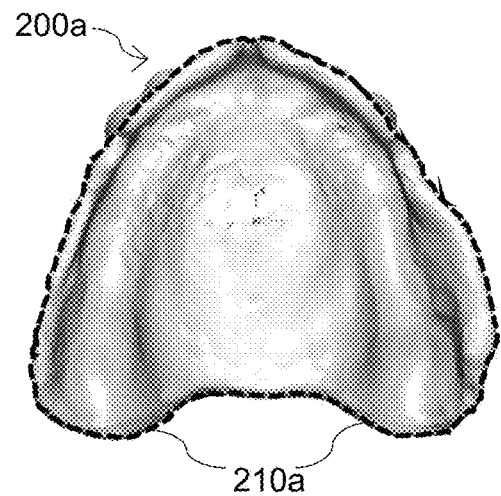
FIG. 2A shows a top view onto the "tissue facing side" of a three-dimensional (3D) digital model of an upper (maxillary) prosthetic denture base (i.e., the obverse side of the "teeth-pockets facing side").
Figure 2B:
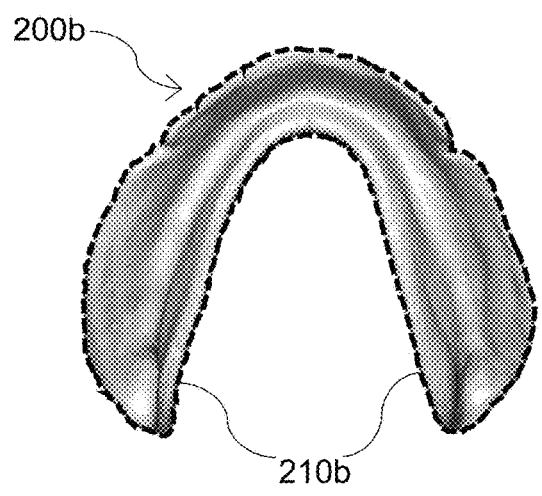
FIG. 2B shows a top view onto the "tissue facing side" of a three-dimensional (3D) digital model of a lower (mandibular) prosthetic denture base (i.e., obverse side of the "teeth-pockets facing side").

FIG. 1A shows an exemplary top view onto the "teeth-pockets facing side" (or cameo surface) of a 3D digital model of an upper (maxillary) prosthetic denture base (100a) with teeth-pockets (110a), while FIG. 1B shows an exemplary top view onto the teeth-pockets facing side of a 3D digital model of a lower (mandibular) prosthetic denture base (100b) with teeth-pockets (110b). FIG. 2A shows an exemplary top view onto the "tissue facing side" (or intaglio surface) of a 3D digital model of an upper (maxillary) prosthetic denture base (200a) (obverse or opposing side of the teeth-pockets facing side), while FIG. 2B shows an exemplary top view onto the tissue facing side of a 3D digital model of a lower (mandibular) prosthetic denture base (200b) (obverse or opposing side of the teeth-pockets facing side). FIGS. 2A and 2B also show a denture border (210a and 210b, respectively) extending around the peripheral edge of each denture base. This denture border represents the boundary line or junction between the teeth-pockets facing side and tissue facing side of a denture base. This initial 3D digital model of a denture base may be assigned a specific orientation in 3D space using a standard three-dimensional Cartesian coordinate (x-y-z) system.

Figure 3A:
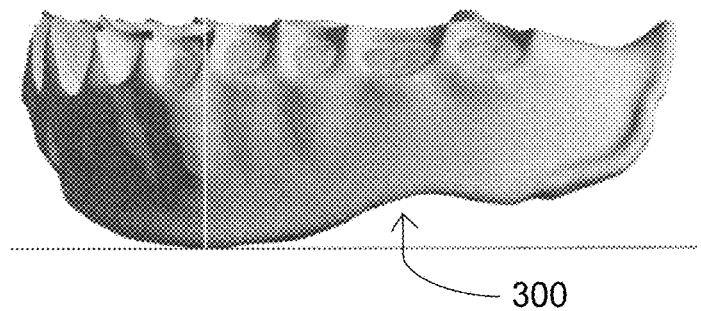
FIG. 3A shows a profile or side view of a three-dimensional (3D) digital model of a denture base, placed in a substantially horizontal position with the "teeth-pockets facing side" in an upwards facing orientation.
Figure 3B:
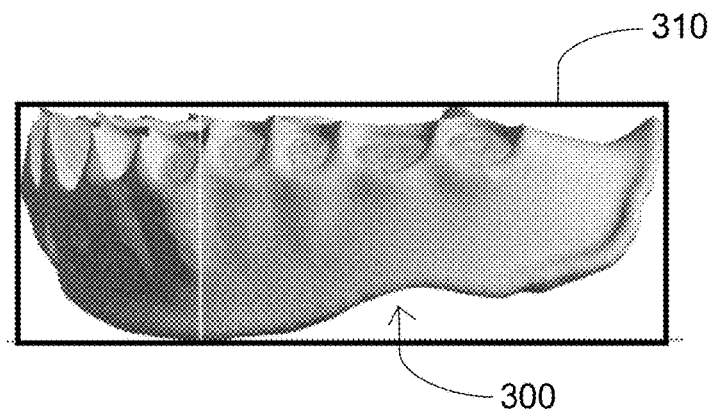
FIG. 3B shows a profile or side view of a three-dimensional (3D) digital model of a denture base, placed in a substantially horizontal position with the "teeth-pockets facing side" in an upwards facing orientation, and further shows a minimum bounding box encompassing the digital model.
Figure 4:
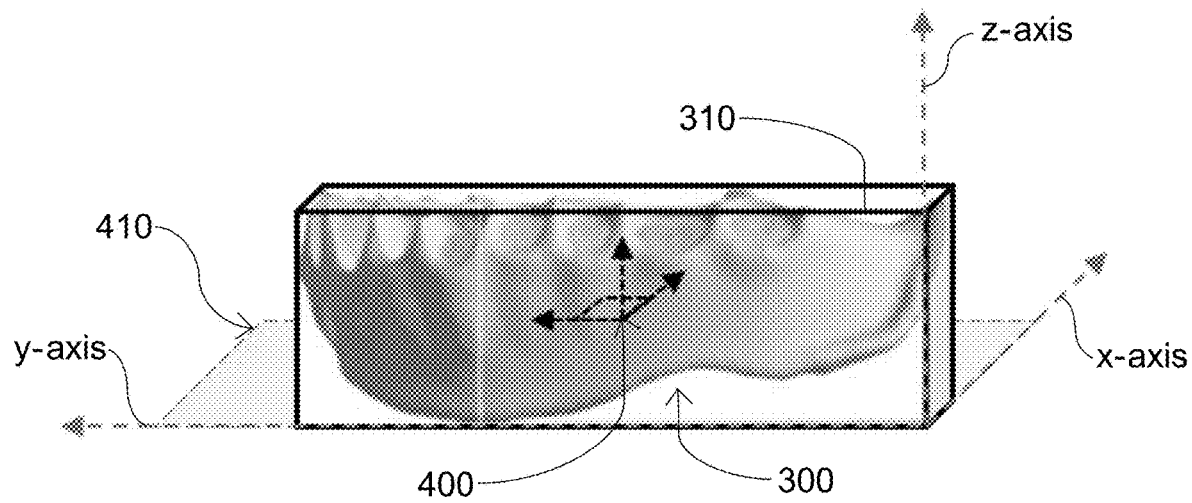
FIG. 4 shows a reference three-dimensional (3D) x-y-z coordinate system and "orienting reference plane" (xy-plane in this example) associated with a "minimum bounding box" encompassing a denture base digital model.

To establish proper orientation of the prosthetic denture base digital model in relation to the virtual build platform of a 3D printing apparatus, an "orienting reference plane" may be created and assigned to the prosthetic denture base digital model in the CAD software. Commercially-available CAD and STL file editing software for additive manufacturing, such as MATERIALISE® MAGICS (available form Materialise NV), is one example suitable for accomplishing this. Creating and assigning an orienting reference plane to the denture base digital model may be accomplished by manipulating spatial orientation of the digital model to place the denture base in a substantially horizontal position where the teeth-pockets facing side may be disposed either in a downward facing, or, alternatively, an upward facing orientation, as shown for example by the denture base digital model (300) in FIG. 3A. A "minimum bounding box" (310) may be applied to encompass the digital model, as further shown for example in FIG. 3B. With a minimum bounding box established, a reference three-dimensional Cartesian coordinate system may be assigned to the prosthetic denture base digital model within the minimum bounding box. FIG. 4 shows an example of a reference three-dimensional coordinate system (400) and orienting reference plane (410) associated with a prosthetic denture base digital model. The reference three-dimensional Cartesian coordinate system may be aligned with the perimeter of the minimum bounding box, and an orienting reference plane (i.e., the x-y plane, or the y-z plane, or the x-z plane) may be aligned and established with the base edge of the minimum bounding box. Having established the reference coordinate system and orienting reference plane for the digital model, the minimum bounding box may be removed, completing the virtual reference model.

Preparing Virtual Reference Model and 3D Digital Model of at Least One Removable Support Structure for Printing The virtual reference model denture base digital file (for example a stereolithography (STL) format) may be prepared further for printing a denture base by uploading or importing the virtual reference model denture file to a light-based 3D printer, such as the CARBON® M1 or M2 printer with Carbon3d software, or other light-based 3D printing systems. The digital file may be spatially manipulated in the software so the tissue facing side of the virtual reference model may be placed proximal to the virtual build platform, and then arranged at an inclination angle between about 65 degrees to about 80 degrees relative to the virtual build platform surface, with anterior teeth-pockets proximal to the virtual build platform surface and posterior teeth-pockets distal to the virtual build platform surface. In a preferred embodiment, the inclination angle may be arranged between about 70 degrees to about 75 degrees relative to the virtual build platform surface.

Figure 5A:
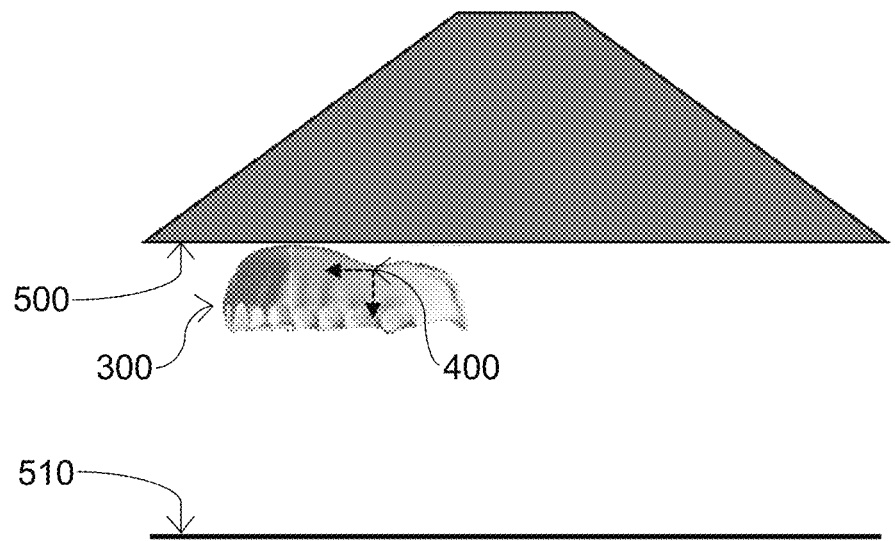
FIG. 5A shows a side view representation of a virtual build platform for a 3D printing apparatus accompanied by a virtual reference model for a denture base positioned at a 0° inclination angle adjacent to the virtual build platform (with "tissue facing side" proximal to virtual build platform).
Figure 5B:
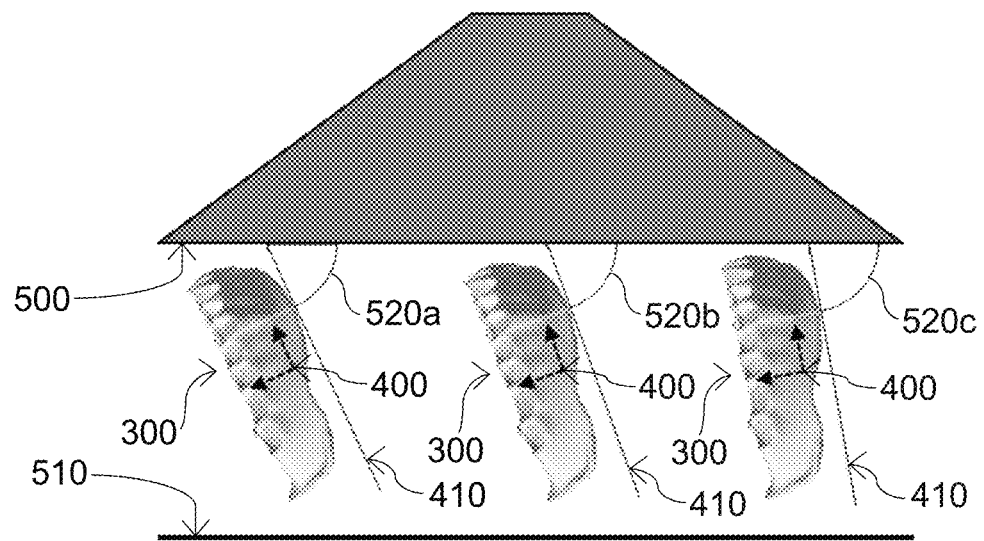
FIG. 5B shows a side view of a virtual build platform for a 3D printing apparatus accompanied by examples of a virtual reference model for a denture base positioned at different inclination angles to the virtual build platform.

FIG. 5A shows a side view representation of a virtual build platform (500) and top surface of reservoir (510) for liquid polymer for a 3D printing apparatus, and a virtual reference model for a denture base (300) with its tissue facing side placed proximal to the virtual build platform surface and positioned at a 0 inclination angle of the orienting reference plane to the virtual build platform surface. FIG. 5B shows a side view representation of a virtual build platform (500) and top surface of reservoir (510) for liquid polymer for a 3D printing apparatus, and examples of a virtual reference model for a denture base (300) arranged at different inclination angles (520a, 520b, 520c) relative to the virtual build platform surface. In a preferred embodiment, also as shown in FIG. 5B, the virtual reference model for a denture base may be arranged with anterior teeth-pockets proximal to the virtual build platform surface, and posterior teeth-pockets distal to the virtual build platform surface. In FIG. 5B, examples of a virtual reference model for a denture base are shown at inclination angles of the orienting reference plane (410) to the build platform surface of 65° (520a), 70° (520b), and 80° (520c).

Figure 6A:
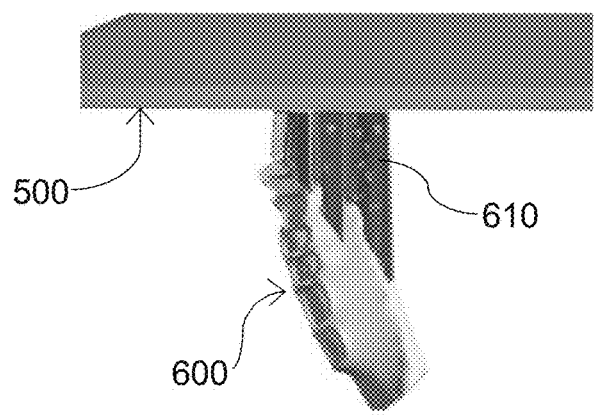
FIGS. 6A, 6B, and 6C show different viewpoints of a virtual denture base model connected to a virtual build platform by an exemplary type of support structure.
Figure 6B:
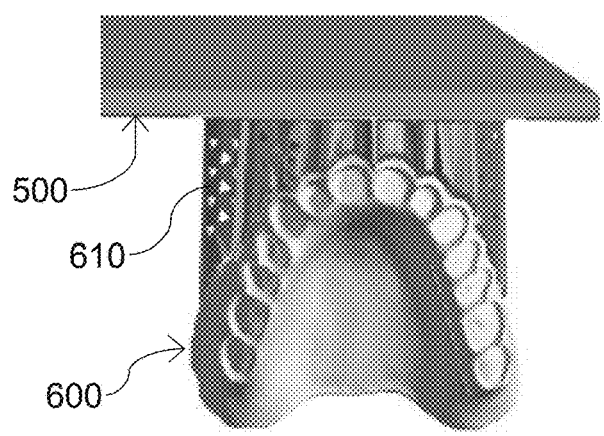
Figure 6C:
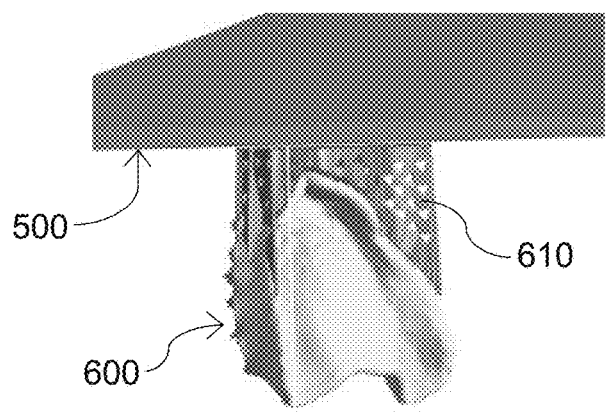

In a further aspect of the invention, a three-dimensional model of at least one removable support structure, connecting the virtual reference model to the virtual build platform surface, may be generated. A three-dimensional model of at least one removable support structure may be generated within software of the 3D printing apparatus either in an automated manner by computational algorithms provided within the software, in a manual manner by an operator directing and manipulating selections within the software, or combinations thereof. Such three-dimensional models of removable support structure(s) may be established (and may be adapted as needed to suit specific aspects of a denture base shape and surface features) to provide sufficient structural support or scaffolding to aid in construction of the prosthetic denture base during printing. In a non-limiting manner, any support structure forms and types known in the art may be chosen and applied to denture base models of the invention, including fence support structures, pin support structures, interlaced support structures, separated support structures, monolithic support structures, and combinations thereof. FIGS. 6A, 6B, and 6C show different views of a virtual denture base model (600) connected to the virtual build platform (500) with an example of one type of support structure (610) (so-called fence support structure) that may be effectively applied in embodiments of the invention.

For a finished denture base, it is advantageous and desirable to achieve a surface quality that is smooth and substantially free of defects, especially in the portions visible when a denture base is in a patient's mouth. Typically, the majority of denture surface on the teeth-pockets facing side is polished to a smooth and glossy finish. Polishing the tissue facing side, however, is generally a practice to be avoided due to detrimental effects on the quality of fit that may be achievable for the patient (e.g., resulting in significant alterations of the surface dimensions, creating unacceptable out-of-tolerance dimensions for proper fit due to material removal). As a result, a denture base tissue facing side that is dimensionally accurate and has a smooth finish, either free of or essentially free of support structure material, following printing is particularly advantageous and desirable.

Thus, in a preferred embodiment, the process of generating a three-dimensional digital model of at least one removable support structure comprises the steps of setting removable support structure contact points on areas of the teeth-pockets facing side and denture border of the virtual reference model, and excluding, or substantially excluding, removable support structure contact points from areas on the tissue facing side and within teeth-pockets of the virtual reference model. Thus, the teeth-pockets and the tissue facing side of the denture base model may be substantially excluded from having contact points with the support structure (i.e., support structure may contact the denture border and portions of the teeth-pockets facing side, while avoiding or remaining substantially outside of the teeth-pockets and the tissue facing side). By arranging support structure contact points to avoid the teeth-pockets and the tissue-facing side, it is possible to prevent the potential problem of creating undesirable residual structural anomalies or blemishes on these surfaces (when the support structure is removed after printing) that may require an additional technician intervention of polishing these surfaces. Polishing these areas during subsequent finishing operations performed post-printing is a practice that is preferable to avoid.

Providing Reservoir of Liquid Photopolymerizable Composition

A reservoir (also more commonly referred to as a vat) of liquid photopolymerizable composition may be provided and placed in contact with a build platform surface of the light-based 3D printing apparatus. In a non-limiting manner, any liquid photopolymerizable composition that can be effectively photocured from a light-based 3D printing apparatus may be suitable to use in methods of the invention. The chemical and physical properties of the liquid photopolymerizable composition may be selected and/or adapted as needed by those skilled in the art to suit specific desired end-use properties (e.g., biocompatibility, mechanical durability (strength/flexibility), color, etc.) of the printed denture base. The liquid photopolymerizable composition also may be selected and/or adapted as needed by those skilled in the art to suit particular constraints or limitations of the chosen 3D printing apparatus. In a preferred embodiment, a photopolymerizable composition may comprise an acrylate-based rubber impact modified resin composition, wherein the final cured resin properties of the photopolymerizable composition have a fracture toughness ($K_{max}$) of between about 1 MPa m$^{1/2}$ to about 4 MPa m$^{1/2}$, a work of fracture of between about 300 J/m$^2$ to about 4000 J/m$^2$, and a flexural strength of between about 5 MPa to about 200 MPa at 23° C., when prepared and measured according to ISO20795-1: 2013.

Selecting Printing Process Parameters of 3D Printing Apparatus

Subject to a number of application-specific considerations, including the operating requirements or constraints of the specific 3D printing apparatus chosen, the chemical and/or physical properties of the specific liquid photopolymerizable composition chosen for printing, as well as the desired thickness of the prosthetic denture base, printing process parameters may be selected within software of the computing system in operative control of the light-based 3D printing apparatus. In a non-limiting manner, suitable printing process parameters may be determined and selected by those skilled in the art so that the liquid photopolymerizable composition may be effectively photocured in accordance with the virtual reference model of a prosthetic denture base and three-dimensional digital model of at least one removable support structure. Effectively photocuring the liquid photopolymerizable composition results in rapid cross-linking and hardening of the polymeric composition in-situ to form a solid structure according to the digital model. Effectively photocuring the liquid photopolymerizable composition may be accomplished with either partial curing (i.e., limited or incomplete cross-linking and hardening) or full curing (i.e., complete, or essentially complete, cross-linking and hardening) of the polymeric composition by the 3D printing apparatus. In a preferred embodiment, in order to further facilitate achieving more desirable levels of dimensional accuracy, slice thicknesses of no more than about 200 microns (e.g., 25 to 100 microns) may be selected for slicing the 3D digital models for printing.

Printing and Post-Printing

Having selected printing process parameters, provided a reservoir of liquid photopolymerizable composition in contact with a build platform surface of the 3D printing apparatus, and provided digital models of a prosthetic denture base and removable support structure to the 3D printing apparatus, the 3D printing apparatus may be instructed (e.g., by commands or executable software code) or otherwise directed by an operator to execute or perform printing (i.e., photocuring) of at least one prosthetic denture base and at least one removable support structure from the liquid photopolymerizable composition.

Following completion of printing, methods of fabricating a prosthetic denture base according to the invention may further comprise the step of removing the at least one printed removable support structure from the build platform surface and the at least one printed prosthetic denture base. The removable support structure may be removed by any suitable physical and/or chemical removal means so as to separate the removable support structure and avoid detrimental effects to either the build platform surface or the printed prosthetic denture base. Suitable physical means may include cutting, trimming, abrading, tearing, peeling, pulling, and prying of the removable support structure at or near points of contact with the prosthetic denture base and the build platform surface.

In another embodiment, methods of fabricating a prosthetic denture base according to the invention may further comprise the step of performing a post-printing wash treatment on the at least one printed prosthetic denture base to remove unreacted or residual liquid photopolymerizable composition from surfaces of the printed prosthetic denture base. The post-printing wash treatment may be performed by immersing the printed prosthetic denture base in a solvent composition comprising a $C_1$-$C_3$ alcohol for a period of between about 1 minute to about 10 minutes. The solvent composition may comprise isopropanol in particular.

In another embodiment, methods of fabricating a prosthetic denture base according to the invention may further comprise the step of performing a secondary curing treatment on the at least one printed prosthetic denture base. Although the initial printing (photocuring) forms the initial solid prosthetic denture base, this secondary curing treatment may be further beneficial for ensuring complete conversion and cross-linking of the polymeric composition to fully realize the final mechanical properties and biocompatibility profile desired for patient use. In this secondary curing procedure, the prosthetic denture base may be exposed to broad-spectrum electromagnetic radiation across wavelengths from about $10^{-8}$ m (10 nanometers) to $10^{-3}$ m (1 millimeter) for between about 5 minutes to about 15 minutes each on both the teeth-pockets facing side and tissue facing side. Exposure to broad-spectrum electromagnetic radiation in the ultraviolet (UV) and visible wavelength ranges may be preferred. An ECLIPSE® PROCESSING UNIT (Model No. 9494800; 120 Volts, 12 Amps, 1200 Watts; available from Dentsply Sirona, Inc.) is one example of a commercially-available light curing device that may be used to perform a secondary curing treatment such as this.

Corrective Digital Scaling on Virtual Reference Model

In still another embodiment, methods of fabricating a prosthetic denture base according to the invention may further comprise the step of performing a corrective digital scaling process on the virtual reference model to fabricate at least one prosthetic denture base.

Performing a corrective digital scaling process on the virtual reference model to fabricate at least one prosthetic denture base may comprise the steps of (a) acquiring an accurate three-dimensional digital model of the tissue facing side of at least one printed prosthetic denture base to establish a first intaglio model image; (b) comparing, in computer-aided digital inspection software, dimensions of the first intaglio model image, relative to dimensions of a second intaglio model image, wherein the second intaglio model image comprises the three-dimensional digital model of the tissue facing side of the virtual reference model from which the at least one printed prosthetic denture base is fabricated; (c) performing, in computer-aided digital inspection software, scaling factor adjustments across the x-dimension, y-dimension, and z-dimension on the first intaglio model image to establish corrective scaling factors across the x-dimension, y-dimension, and z-dimension that reduce differences of the first intaglio model image relative to the second intaglio model image; (d) generating, in computer-aided digital inspection software, a corrected prosthetic denture base digital model, wherein each of the corrective scaling factors for the x-dimension, y-dimension, and z-dimension established from performing scaling factor adjustments to the first intaglio model image are applied to corresponding dimensions of the virtual reference model; (e) preparing, in software of the computer system in operative control of the light-based three-dimensional printing apparatus, the corrected prosthetic denture base digital model and a three-dimensional digital model of at least one removable support structure for printing; (f) providing a reservoir of liquid photopolymerizable composition in contact with the build platform surface of the light-based three-dimensional printing apparatus; (g) selecting, in software of the computer system in operative control of the light-based three-dimensional printing apparatus, printing process parameters to effectively photocure the liquid photopolymerizable composition in accordance with the corrected prosthetic denture base digital model and three-dimensional digital model of at least one removable support structure; and (h) instructing the light-based three-dimensional printing apparatus to print at least one prosthetic denture base and removable support structure from the liquid photopolymerizable composition.

In an aspect herein, the process of acquiring an accurate three-dimensional digital model of the tissue facing side of at least one printed prosthetic denture base to establish a first intaglio model image may comprise the steps of obtaining, with a computerized high-resolution three-dimensional imaging system, a three-dimensional digital image of the tissue facing side of the at least one printed prosthetic denture base to establish a raw three-dimensional digital model of the tissue facing side of the printed prosthetic denture base; identifying, with computer-aided digital inspection software, extrinsic digital surface artifact features on the raw three-dimensional digital model generated by the high-resolution three-dimensional imaging system; and subtracting, with computer-aided digital inspection software, extrinsic digital surface artifact features from the raw three-dimensional digital model to establish an accurate three-dimensional digital model of the tissue facing side of at least one printed prosthetic denture base.

In another aspect herein, the process of comparing dimensions of the first intaglio model image to dimensions of a second intaglio model image may comprises the steps of: providing the first intaglio model image to computer-aided digital inspection software; providing the second intaglio model image to computer-aided digital inspection software; applying a best fit alignment operation using an iterative closest point (ICP) algorithm on the first and second intaglio model images to perform a digital superimposition of the first intaglio model image onto the second intaglio model image; applying three-dimensional color maps to each of the first and second intaglio model images; and comparing differences of the superimposed first and second intaglio model images to identify areas on the first intaglio model image displaying dimensional deviations relative to the second intaglio model image. The ICP algorithm is one of the widely used algorithms in aligning three-dimensional models given an initial guess of the rigid body transformation (combination of translation and rotation) required.

In still another aspect herein, the process of performing scaling factor adjustments across the x-dimension, y-dimension, and z-dimension on the first intaglio model image may comprise the steps of: applying digital adjustment across the x-dimension, y-dimension, and z-dimension of the first intaglio model image to decrease areas having positive dimensional deviation on the three-dimensional color map of the first intaglio model image; applying digital adjustment across the x-dimension, y-dimension, and z-dimension of the first intaglio model image to increase areas having negative dimensional deviation displayed on the three-dimensional color map of the first intaglio model image; and repeating, in an iterative manner, digital adjustments of the first intaglio model image to establish corrective scaling factors across the x-dimension, y-dimension, and z-dimension that reduce three-dimensional color map deviations across the first intaglio model image, whereby at least about 80 percent of the first intaglio model image is located within the range of between about −100 microns to about +100 microns of the second intaglio model image.

To assess the dimensional accuracy of a fabricated denture base, a technique referred to as 3D comparison or inspection tool (also sometimes referred to as a "part-to-CAD" comparison) may be employed. It allows for comparison of dimensions of the actual, as-produced and measured part to be performed relative to the digital model from which the part was produced. High-resolution 3D scanners (e.g., laser scanners, industrial computed tomography) may be used to generate a digital surface profile from the printed object's surface that may then be compared against the reference CAD model used by the printer for printing the object. When using laser scanners on glossy or reflective objects like denture bases, spraying the object with an anti-reflective coating is a common practice for reducing surface reflectivity to more readily achieve accurate surface image capture. Commercially-available digital inspection software, such as GEOMAGIC® CONTROL X™ software (available from 3D Systems, Inc.) or other similar metrology software platforms known to those skilled in the art, may be used for this 3D comparison or inspection.

Figure 7:
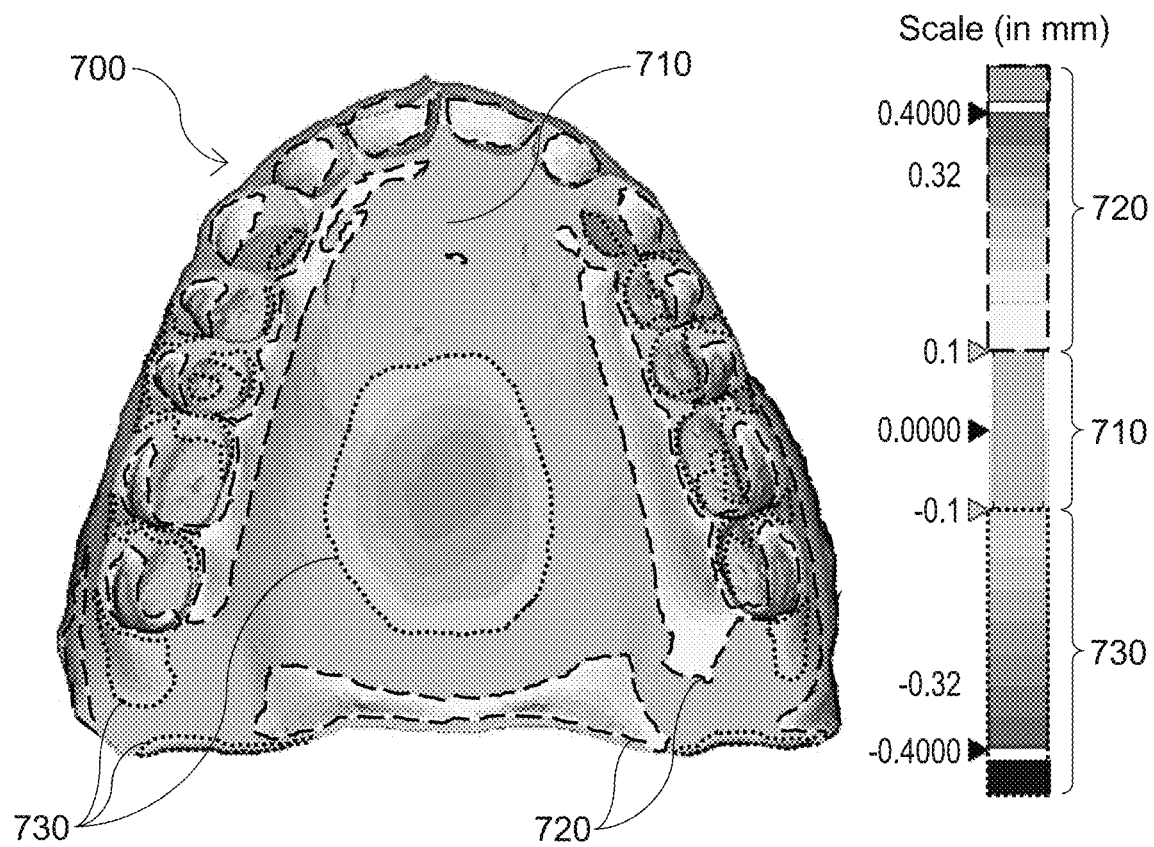
FIG. 7 shows an exemplary image of a "color map" comparing the "tooth-pockets facing side" of a printed maxillary denture base (one that has been 3D scanned to generate a digital surface profile) to the virtual reference model denture base from which it was printed.

The process of 3D comparison provides what can be referred to as a "color map" which shows a 3D data comparison of the final object dimensions compared to the CAD model dimensions from which the object was produced. This color map displays color differences representing dimensional differences across the 3D image according to a reference color scale. This is a useful technique in determining dimensional accuracy of a final traditional (compression/cold pour), milled, or printed denture base. FIG. 7 shows an example image for a color map of the tooth-pockets facing side of a printed maxillary denture base (700) that has been 3D scanned and then compared against the CAD model of the denture base from which it was printed (in this particular example, in order to facilitate display of various dimensional color differences for this example, the denture base was not printed in accordance with embodiments of the invention). The color scale (displayed to the right of the denture base color map image in FIG. 7) shows the actual scale (in millimeters) of color changes corresponding to the extent of dimensional conformity and/or dimensional incongruity of the printed denture base file relative to the CAD model file from which it was printed (the STL file from the 3D scan of a printed denture base was superimposed on the corresponding STL file of the CAD model). The actual tolerance limits and/or ranges for dimensional conformity or deviation may be established as a matter of preference to achieve a given level of fabrication quality or precision suitable to meet end-use requirements of patients and dental practitioners. Referring to FIG. 7, "green" areas or zones (displayed as 710 on the color scale and the denture base image) represent dimensional deviations ranging from between about +0.1 mm (about +100 microns) to about −0.1 mm (about −100 microns). Thus, a "green" color shows area or zones having strong or close dimensional fit with very limited deviation from the CAD model within the specified tolerance limits of +0.1 mm to −0.1 mm. Referring again to FIG. 7, the "yellow-orange-red" areas or zones (displayed as 720 on the color scale and the denture base image) represent all "positive" (i.e., thicker, bigger, protruding or bulging) dimensional deviations of more than about +0.1 mm (more than about +100 microns). Still referring to FIG. 7, the "fight blue-dark blue" areas or zones (displayed as 730 on the color scale and the denture base image) represent all "negative" (i.e., thinner, smaller, depressed or sunken) dimensional deviations of more than about −0.1 mm (more than about −100 microns).

Computer System for Digital Model Visualization, Preparation, and/or Modification One or more computer systems may be employed for 3D digital model visualization, preparation, and/or modification in accordance with at least some of the method embodiments described herein. Although various embodiments may be described herein in terms of an exemplary computer system, after reading this description, it may become apparent to a person skilled in the relevant art(s) how to implement the disclosure using other computer systems and/or architectures.

In one example embodiment herein, the computer system may include at least one computer processor and at least one modeling device, modeling system, user interface and input unit which may form at least part of any of the devices, components, and/or systems discussed herein. The computer processor may include, for example, a central processing unit, a multiple processing unit, an application-specific integrated circuit ("ASIC"), a field programmable gate array ("FPGA"), or the like. The processor may be connected to a communication infrastructure (e.g., a communications bus, or a network). In an embodiment herein, the processor may receive an indication that a design is in progress or the 3D digital model is being engaged and may obtain instructions concerning the dynamic adjustment of the 3D digital model view/orientation from a memory of the modeling system and/or from one or more storage units of the computer system. The processor may then load the instructions and execute the loaded instructions. This dynamic adjustment of the 3D digital model view/orientation may then be rendered on a display unit.

The user interface (or other output interface) may forward video graphics, text, and other data from the communication infrastructure (or from a frame buffer) for display on the display unit. For example, the user interface may include a video card with a graphics processing unit.

The computer system may also include an input unit that may be used by a user of the computer system to send information to the computer processor. In one embodiment, the input unit may be a trackball or other input device such as a keyboard or stylus or gesture recognition device. Alternatively, the input unit may be a finger or stylus to be used on a touchscreen interface. In one example, the display unit, the input unit, and the computer processor may collectively form a user interface.

One or more steps of generating dynamic adjustments may be stored on a non-transitory storage device in the form of computer-readable program instructions. To execute a procedure, the processor loads the appropriate instructions, as stored on a storage device, into memory and then executes the loaded instructions.

The computer system may further comprise a main memory, which may be a random-access memory ("RAM"), and also may include a secondary memory. The secondary memory may include, for example, a hard disk drive and/or a removable-storage drive (e.g., a floppy disk drive, a magnetic tape drive, an optical disk drive, a flash memory drive, and the like). The removable-storage drive may read from and/or write to a removable storage unit in a well-known manner. The removable storage unit may be, for example, a floppy disk, a magnetic tape, an optical disk, a flash memory device, and the like, which may be written to and read from by the removable-storage drive. The removable storage unit may include a non-transitory computer-readable storage medium storing computer-executable software instructions and/or data.

In further alternative embodiments, the secondary memory may include other computer-readable media storing computer-executable programs or other instructions to be loaded into the computer system. Such devices may include a removable storage unit and an interface (e.g., a program cartridge and a cartridge interface); a removable memory chip (e.g., an erasable programmable read-only memory ("EPROM") or a programmable read-only memory ("PROM")) and an associated memory socket; and other removable storage units and interfaces that allow software and data to be transferred from the removable storage unit to other parts of the computer system.

The computer system also may include a communications interface that enables software and data to be transferred between the computer system and external devices. Such an interface may include a modem, a network interface (e.g., an Ethernet card or an IEEE 802.11 wireless LAN interface), a communications port (e.g., a Universal Serial Bus ("USB") port or a FireWire® port), a Personal Computer Memory Card International Association ("PCMCIA") interface, Bluetooth®, and the like. Software and data transferred via the communications interface may be in the form of signals, which may be electronic, electromagnetic, optical or another type of signal that may be capable of being transmitted and/or received by the communications interface. Signals may be provided to the communications interface via a communications path (e.g., a channel). The communications path carries signals and may be implemented using wire or cable, fiber optics, a telephone line, a cellular link, a radio-frequency ("RF") link, or the like. The communications interface may be used to transfer software or data or other information between the computer system and a remote server or cloud-based storage.

One or more computer programs or computer control logic may be stored in the main memory and/or the secondary memory. The computer programs may also be received via the communications interface. The computer programs may include computer-executable instructions which, when executed by the computer processor, cause the computer system to perform the methods as described hereinafter. Accordingly, the computer programs may control the computer system and other components of the systems for visualization, preparation, and/or modification of 3D digital models.

In another embodiment, the software may be stored in a non-transitory computer-readable storage medium and loaded into the main memory and/or the secondary memory of the computer system using the removable-storage drive, the hard disk drive, and/or the communications interface. Control logic (software), when executed by the processor, causes the computer system, and more generally the system for visualization, preparation, and/or modification of 3D digital models, to perform all or some of the some of the methods described herein.

Implementation of such other hardware arrangement so as to perform the functions described herein will be apparent to persons skilled in the relevant art(s) in view of this description.

EXAMPLES

For purposes of the following examples, prosthetic denture bases were printed on CARBON® M1 or M2 printers (available from Carbon, Inc.) based on their so-called continuous liquid interface production (CLIP) stereolithography technology. Prosthetic denture bases were produced from a proprietary acrylate-based photopolymerizable liquid resin composition (Dentsply Sirona DLP 291 formulation, an acrylate-based rubber impact modified resin composition) having a viscosity within a range of about 4500 to about 6500 cP (typically averaging 5500 cP) at 25° C. On the CARBON® M1 and M2 printers, printing process parameters were provided for a resin curing dosage ($D_c$), or dosage to cure, of 5.0 to 7.0 (e.g., 5.5), a resin absorption coefficient ($\alpha$) of 0.0014 to 0.0022 (e.g., 0.0016), and exposure compensation (EC) of 1 to 4 (e.g., 1.5). Additionally, a slice thicknesses of 25 to 200 microns (e.g., 100 microns) was selected for slicing the 3D digital models for printing. Printed denture bases were washed in isopropanol for at least 5 minutes and received secondary curing in an ECLIPSE® PROCESSING UNIT (Model No. 9494800; available from Dentsply Sirona, Inc.) for 10 minutes each on both the teeth-pockets facing side and the tissue facing side.

Examples 1A and 1B

Figure 8A:
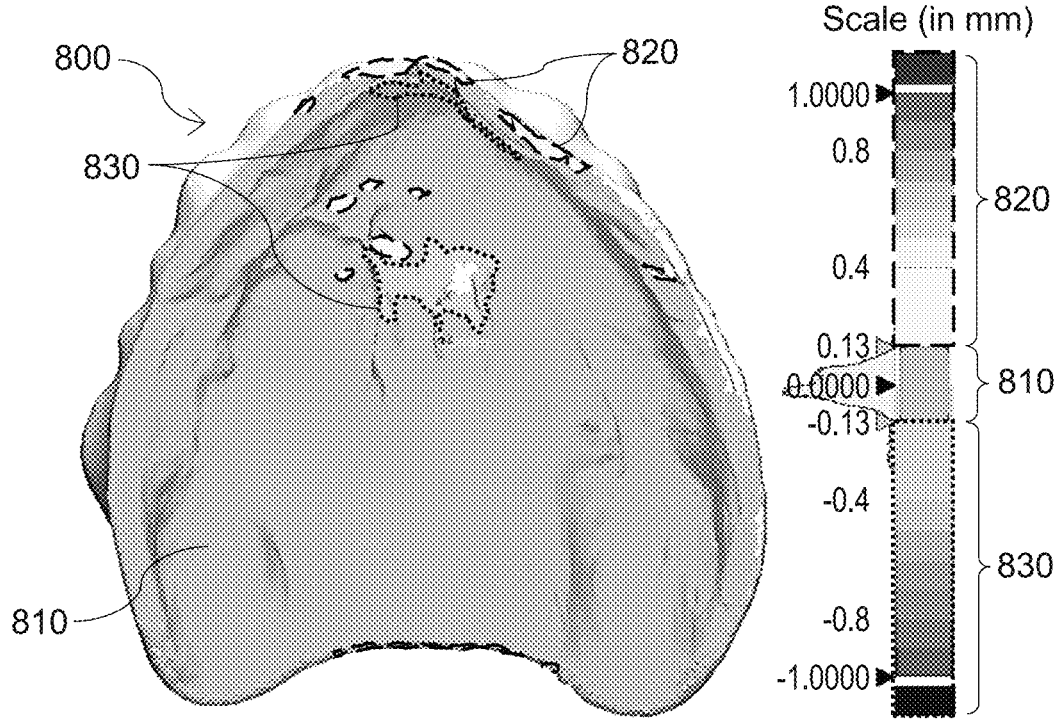
FIG. 8A shows an exemplary image of a "color map" comparing the "tissue facing side" of a printed maxillary denture base (one that has been 3D scanned to generate a digital surface profile) to the virtual reference model denture base from which it was printed.
Figure 8B:
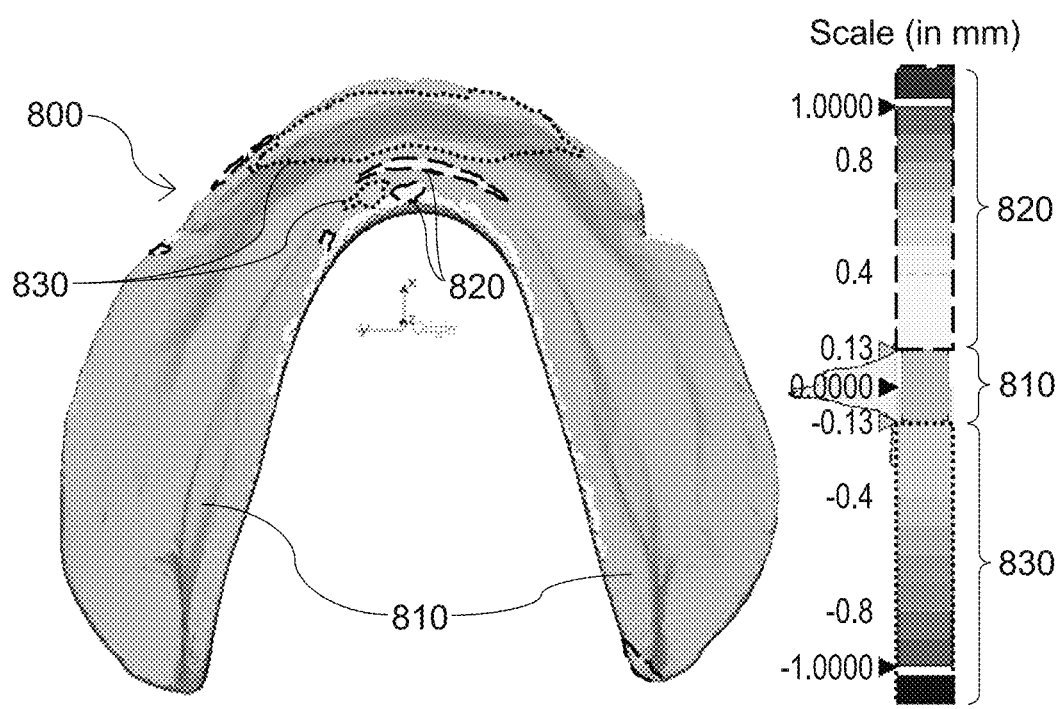
FIG. 8B shows an exemplary image of a "color map" comparing the "tissue facing side" of a printed mandibular denture base (one that has been 3D scanned to generate a digital surface profile) to the virtual reference model denture base from which it was printed.

Virtual reference models for an upper (maxillary) prosthetic denture base (Example 1A) and a lower (mandibular) prosthetic denture base (Example 1B) were each prepared and printed at one of the preferred inclination angles of orientation relative to the build platform surface (in these examples, 70° was used). FIG. 8A shows a color map comparison of the tissue facing side for the upper (maxillary) printed prosthetic denture base, relative to the tissue facing side of the virtual reference model from which it was printed. Similarly, FIG. 8B shows a color map comparison of the tissue facing side for the lower (mandibular) printed prosthetic denture base, relative to the tissue facing side of the virtual reference model from which it was printed. In both cases, "green" areas or zones (displayed as 810 on the color scale and the denture base image) represent dimensional deviations ranging from between about +0.13 mm (about +130 microns) to about −0.13 mm (about −130 microns). Additionally, "yellow-orange-red" areas or zones (displayed as 820 on the color scale and the denture base image) represent all "positive" (i.e., thicker, bigger, protruding or bulging) dimensional deviations of more than about +0.13 mm (more than about +130 microns), while "light blue-dark blue" areas or zones (displayed as 830 on the color scale and the denture base image) represent all "negative" (i.e., thinner, smaller, depressed or sunken) dimensional deviations of more than about −0.13 mm (more than about −130 microns).

From these figures, it can be observed that the "green" color areas or zones represent a substantial majority of the surface area on the tissue facing side for each of the printed prosthetic denture bases. Thus, analysis of the color map comparisons demonstrates that a substantial majority of both the upper and lower printed denture bases were well within dimensional tolerance limits specified here of about +130 microns to about −130 microns. This is advantageous for achieving an acceptable denture base device possessing very accurate dimensions for a comfortable and secure customized fit in a patient for which it is designed. In fact, the overall comparative results show that at least 90% of the tissue facing side surface areas for each of these printed denture bases were within about ≤130 microns (≤0.13 mm) of their respective virtual reference models. For the sake of clarity, it should be further noted here that the tissue facing surface of these printed denture bases was sprayed with a commercially-available anti-reflective coating to reduce surface reflectivity prior to surface image capture in a high-resolution laser optical scanner. In other 3D imaging techniques (e.g., computed tomography scan, or CT scan) applying an anti-reflective coating to the printed denture base surface may not be needed. In these examples, because the spray coating introduces an anti-reflective coating layer thickness that increases the overall surface thickness of the scanned denture base by about +30 microns, a dimensional tolerance limit of about −130 microns (−0.13 mm) to about +130 microns (+0.13 mm) was therefore selected. This was done for the purpose of establishing confidence that actual dimensions of printed denture bases were within preferred dimensional tolerance limits of about −100 microns (−0.10 mm) to about +100 microns (+0.10 mm).

Examples 2a to 2D

Virtual reference models of four different patient cases for upper (maxillary) prosthetic denture bases were prepared and printed at a 70° inclination angle of orientation to further demonstrate effectiveness in fabricating denture bases having excellent dimensional accuracy consistent with the virtual reference model from which each was printed. Printed denture bases were sprayed with anti-reflective coating prior to surface image capture in a high-resolution laser optical scanner. For each of these patient cases, color map comparisons of the tissue facing side of the printed denture base relative to the virtual reference model from which it was printed were analyzed. Results for the percentage of total tissue facing side surface area residing within two different dimensional tolerance limits (+100 microns to −100 microns, and +130 microns to −130 microns) are shown in Table 1.

TABLE 1

Percentage of total surface area for tissue facing side of printed denture bases (relative to tissue facing side of virtual reference models from which each were printed) remaining within specified dimensional tolerance limits.

| Patient Cases | % within Tolerance Limits (+/−100 microns) | % within Tolerance Limits (+/−130 microns) |
| --- | --- | --- |
| Example 2A - Patient 1 (Upper) | 90 | 94 |
| Example 2B - Patient 2 (Upper) | 82 | 90 |
| Example 2C - Patient 3 (Upper) | 82 | 91 |
| Example 2D - Patient 4 (Upper) | 85 | 91 |

Examples 3A to 3C

Figure 9A:
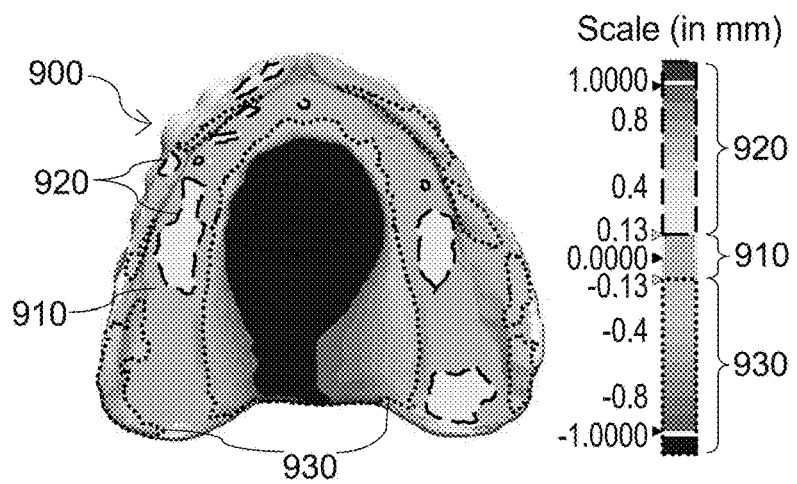
FIG. 9A shows a "color map" comparing the tissue facing side of an upper (maxillary) printed prosthetic denture base, relative to the tissue facing side of the virtual reference model from which it was printed, that was printed at an inclination angle of 45.
Figure 9B:
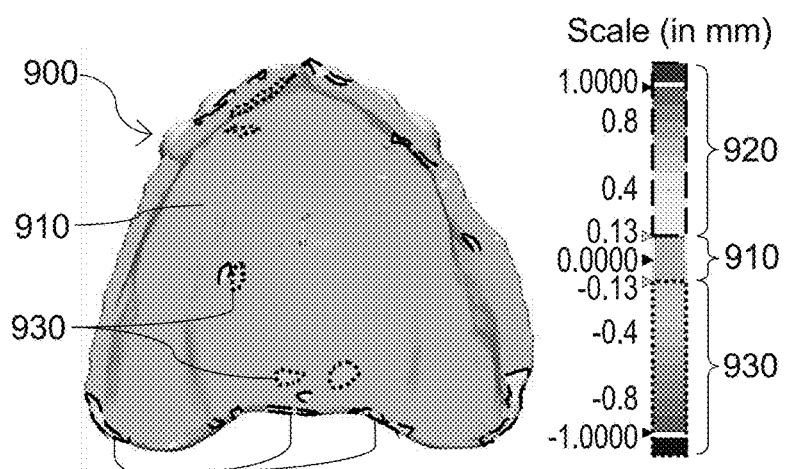
FIG. 9B shows a color map comparing the tissue facing side of an upper (maxillary) printed prosthetic denture base, relative to the tissue facing side of the virtual reference model from which it was printed, that was printed at an inclination angle of 70°.
Figure 9C:
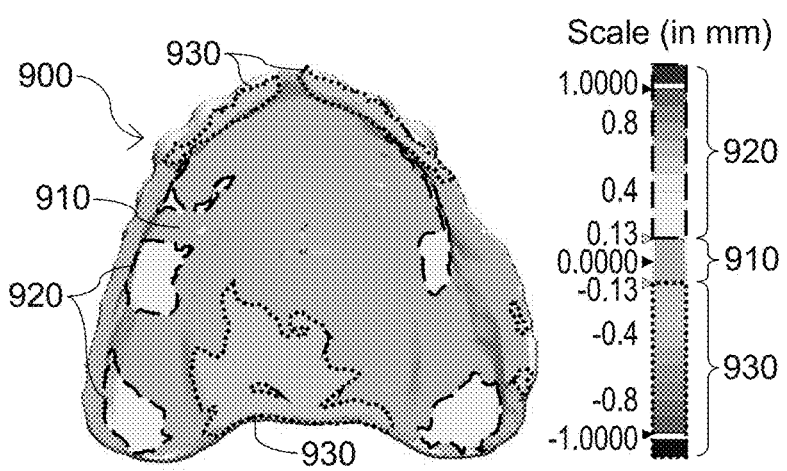
FIG. 9C shows a color map comparing the tissue facing side of an upper (maxillary) printed prosthetic denture base, relative to the tissue facing side of the virtual reference model from which it was printed, that was printed at an inclination angle of 85°.

To demonstrate the effect of printing angle selection on printed denture base dimensional accuracy, the virtual reference model for an upper (maxillary) prosthetic denture base was prepared and printed at three distinctly different inclination angles of orientation relative to the build platform surface. Printed denture bases were sprayed with anti-reflective coating prior to surface image capture in a high-resolution laser optical scanner. FIG. 9A (Example 3A) shows a color map comparison of the tissue facing side for an upper (maxillary) printed prosthetic denture base, relative to the tissue facing side of the virtual reference model from which it was printed, that was printed at an inclination angle of 45°. FIG. 9B (Example 3B) shows a color map comparison of the tissue facing side for an upper (maxillary) printed prosthetic denture base, relative to the tissue facing side of the virtual reference model from which it was printed, that was printed at an inclination angle of 70°. FIG. 9C (Example 3C) shows a color map comparison of the tissue facing side for an upper (maxillary) printed prosthetic denture base, relative to the tissue facing side of the virtual reference model from which it was printed, that was printed at an inclination angle of 85°. The same dimensional tolerance limit of +130 microns to −130 microns was applied to each of these color map comparisons.

From examination of FIGS. 9A and 9C, numerous dimensional deviation areas or zones (displayed as features 920 and 930), several of which cover extensive surface areas, can be readily observed. In FIG. 9A there is a particularly large zone within the central palatal area having a high "negative" (i.e., thinner, smaller, depressed or sunken) dimensional deviation of greater than −130 microns, a substantial portion of which can be seen to deviate more than −1000 microns (−1 mm). FIG. 9B, however, in contrast to FIGS. 9A and 9C, can be seen to be substantially covered by "green" color (910) (i.e., dimensional deviations are within specified limits of +130 microns to −130 microns). Results for the percentage of total tissue facing side surface area residing within the dimensional tolerance limits (+130 microns to −130 microns) for Examples 3A to 3C are shown in Table 2.

TABLE 2

Percentage of total surface area for tissue facing side of printed denture bases (relative to tissue facing side of virtual reference models from which each were printed) remaining within specified dimensional tolerance limits.

| Color Map Comparison | % within Tolerance Limits (+/−130 microns) |
| --- | --- |
| Example 3A - Upper Denture Base Printed at 45° | 52 |
| Example 3B - Upper Denture Base Printed at 70° | 95 |
| Example 3C - Upper Denture Base Printed at 85° | 72 |

The previously described embodiments of the invention provide distinct advantages for improving print quality characteristics that can be obtained for a prosthetic denture base fabricated on a light-based three-dimensional printing apparatus. Methods according to one or more embodiments of the invention can produce prosthetic denture bases possessing excellent dimensional accuracy consistent with the digital computer-aided design model information provided to a light-based 3D printing apparatus. Prosthetic denture bases can also be fabricated that minimize, or possibly even eliminate, the need or concern for undesirable residual structural anomalies or blemishes (being caused by poorly positioned or extensively distributed support structures) that may need to be subsequently removed from dimensionally-sensitive areas, such as the tissue facing side, or teeth pockets of the denture base.

It should be understood that the present invention does not require that all the preferred or advantageous features, nor all the advantages, need to be incorporated into every embodiment of the invention. Although the present invention has been described in considerable detail with reference to certain preferred versions thereof, other versions are possible within the scope the invention. Therefore, the spirit and scope of the appended claims should not be limited to the description of the preferred versions contained herein. All of the features disclosed in this specification, including any accompanying claims, abstract, and drawings, may be replaced by alternative features serving the same, equivalent, or similar purpose, unless expressly stated otherwise.

Thus, unless expressly stated otherwise, each feature disclosed is one example only of a generic series of equivalent or similar features.

What is claimed is:

1. A method of fabricating a prosthetic denture base using a light-based three-dimensional (3D) printing apparatus, comprising the steps of:
   (a) selecting a virtual 3D reference model of a prosthetic denture base, wherein the virtual 3D reference model of the prosthetic denture base includes:
      i. a teeth-pockets facing side;
      ii. a tissue facing side on the opposing side of the teeth-pockets facing side;
      iii. a denture border extending around the peripheral edge of the prosthetic denture base, the denture border forming a boundary between the teeth-pockets facing side and tissue facing side; and
      iv. an orienting reference plane aligned with a transverse or horizontal plane that is substantially aligned with the teeth-pockets facing side;
   (b) creating at least one removable support structure about the virtual 3D reference model of the prosthetic denture base by:
      i. positioning the virtual 3D reference model adjacent to a virtual build platform surface of the light-based 3D printing apparatus, wherein the tissue facing side of the virtual 3D reference model is placed proximal to the virtual build platform surface;
      ii. manipulating a spatial orientation of the virtual 3D reference model by arranging the orienting reference plane of the virtual 3D reference model at an inclination angle between about 65 degrees to about 80 degrees relative to the virtual build platform surface, so that the anterior teeth-pockets are proximal to the virtual build platform surface while the posterior teeth-pockets are distal to the virtual build platform surface; and
      iii. forming a revised 3D digital model having the at least one removable support structure and the virtual 3D reference model, wherein the at least one removable support structure connects the virtual 3D reference model to the virtual build platform surface;
   (c) providing a reservoir of liquid photopolymerizable composition in contact with a build platform surface of the light-based three-dimensional printing apparatus;
   (d) selecting, in software of a computer system that is in operative control of the light-based three-dimensional printing apparatus, printing process parameters to effectively photocure the liquid photopolymerizable composition in accordance with the revised 3D digital model; and
   (e) instructing the light-based three-dimensional printing apparatus to print the prosthetic denture base and the at least one removable support structure based on the revised 3D digital model from the liquid photopolymerizable composition.

2. The method of claim 1, wherein the process of creating at least one removable support structure about the virtual 3D reference model of the prosthetic denture base further comprises the steps of:
   (a) setting removable support structure contact points on areas of the teeth-pockets facing side and denture border of the virtual 3D reference model; and
   (b) excluding, or substantially excluding, removable support structure contact points from areas on the tissue facing side and within teeth-pockets of the virtual 3D reference model.

3. The method of claim 1, further comprising the step of removing the at least one printed removable support structure from the build platform surface and the printed prosthetic denture base following completion of printing.

4. The method of claim 3, further comprising the step of performing a post-printing wash treatment on the printed prosthetic denture base using a solvent composition including a $C_1$-$C_3$ alcohol for a period of between about 1 minute to about 10 minutes.

5. The method of claim 4, further comprising the step of performing a secondary curing treatment on the printed prosthetic denture base, wherein the printed prosthetic denture base is exposed to broad-spectrum electromagnetic radiation across wavelengths from about $10^{-8}$ m to $10^{-3}$ m for between about 5 minutes to about 15 minutes each on both the teeth-pockets facing side and tissue facing side.

6. The method of claim 5, further comprising the step of performing a corrective digital scaling process on the virtual 3D reference model to fabricate a corrected prosthetic denture base, wherein performing the corrective digital scaling process on the virtual 3D reference model includes the steps of:
   (a) acquiring an accurate three-dimensional digital model of a tissue facing side of the printed prosthetic denture base to establish a first intaglio model image;
   (b) comparing, in computer-aided digital inspection software, dimensions of the first intaglio model image to dimensions of a second intaglio model image which represents the tissue facing side of the virtual 3D reference model;
   (c) performing, in the computer-aided digital inspection software, scaling factor adjustments across the x-dimension, y-dimension, and z-dimension on the first intaglio model image to establish corrective scaling factors across the x-dimension, y-dimension, and z-dimension that reduce differences of the first intaglio model image relative to the second intaglio model image;
   (d) generating, in the computer-aided digital inspection software, a corrected prosthetic denture base digital model, wherein each of the corrective scaling factors for the x-dimension, y-dimension, and z-dimension established from performing scaling factor adjustments to the first intaglio model image are applied to corresponding dimensions of the virtual 3D reference model;
   (e) creating at least one removable structure about the corrected prosthetic denture base digital model by:
      i. positioning the corrected prosthetic denture base digital model adjacent to the virtual build platform surface of the light-based 3D printing apparatus, wherein the tissue facing side of the corrected prosthetic denture base digital model is placed proximal to the virtual build platform surface;
      ii. manipulating a spatial orientation of the corrected prosthetic denture base digital model by arranging the orienting reference plane of the corrected prosthetic denture base digital model at an inclination angle between about 65 degrees to about 80 degrees relative to the virtual build platform surface, so that the anterior teeth-pockets are proximal to the virtual build platform surface while the posterior teeth-pockets are distal to the virtual build platform surface; and
      iii. forming a corrected 3D digital model having the at least one removable support structure and the corrected prosthetic denture base digital model, wherein the at least one removable support structure connects the corrected prosthetic denture base digital model to the virtual build platform surface;

(f) providing the reservoir or a second reservoir of liquid photopolymerizable composition in contact with the build platform surface of the light-based three-dimensional printing apparatus;

(g) selecting, in the software of the computer system in operative control of the light-based three-dimensional printing apparatus, printing process parameters to effectively photocure the liquid photopolymerizable composition in accordance with the corrected 3D digital model; and (h) instructing the light-based three-dimensional printing apparatus to print the corrected prosthetic denture base and the at least one removable support structure based on the corrected 3D digital model from the liquid photopolymerizable composition.

7. The method of claim 6, wherein the process of acquiring the accurate three-dimensional digital model of the tissue facing side of printed prosthetic denture base to establish the first intaglio model image includes the steps of:

(a) obtaining, with a computerized high-resolution three-dimensional imaging system, a three-dimensional digital image of the tissue facing side of the printed prosthetic denture base to establish a raw three-dimensional digital model of the tissue facing side of the printed prosthetic denture base;

(b) identifying, with the computer-aided digital inspection software, extrinsic digital surface artifact features on the raw three-dimensional digital model generated by the high-resolution three-dimensional imaging system; and (c) subtracting, with the computer-aided digital inspection software, extrinsic digital surface artifact features from the raw three-dimensional digital model to establish an accurate three-dimensional digital model of the tissue facing side of printed prosthetic denture base.

8. The method of claim 6, wherein the process of comparing dimensions of the first intaglio model image to dimensions of a second intaglio model image includes the steps of:

(a) providing the first intaglio model image to the computer-aided digital inspection software;

(b) providing the second intaglio model image to the computer-aided digital inspection software;

(c) applying a best fit alignment operation using an iterative closest point (ICP) algorithm on the first and second intaglio model images to perform a digital superimposition of the first intaglio model image onto the second intaglio model image;

(d) applying three-dimensional color maps to each of the first and second intaglio model images; and (e) comparing differences of the superimposed first and second intaglio model images to identify areas on the first intaglio model image displaying dimensional deviations relative to the second intaglio model image.

9. The method of claim 6, wherein the process of performing scaling factor adjustments across the x-dimension, y-dimension, and z-dimension on the first intaglio model image includes the steps of:

(a) applying digital adjustment across the x-dimension, y-dimension, and z-dimension of the first intaglio model image to decrease areas having positive dimensional deviation on the three-dimensional color map of the first intaglio model image;

(b) applying digital adjustment across the x-dimension, y-dimension, and z-dimension of the first intaglio model image to increase areas having negative dimensional deviation displayed on the three-dimensional color map of the first intaglio model image; and (c) repeating, in an iterative manner, digital adjustments of the first intaglio model image to establish corrective scaling factors across the x-dimension, y-dimension, and z-dimension that reduce three-dimensional color map deviations across the first intaglio model image, whereby at least about 80 percent of the first intaglio model image is located within the range of between about −100 microns to about +100 microns of the second intaglio model image.

10. The method of claim 6, further comprising the step of removing the at least one printed removable support structure from the build platform surface and the printed corrected prosthetic denture base following completion of printing.

11. The method of claim 10, further comprising the step of performing a post-printing wash treatment on the printed corrected prosthetic denture base using a solvent composition including a $C_1$-$C_3$ alcohol for a period of between about 1 minute to about 10 minutes.

12. The method of claim 11, further comprising the step of performing a secondary curing treatment on the printed corrected prosthetic denture base, wherein the printed corrected prosthetic denture base is exposed to broad-spectrum electromagnetic radiation across wavelengths from about $10^{-8}$ m to $10^{-3}$ m for between about 5 minutes to about 15 minutes each on both the teeth-pockets facing side and tissue facing side.

* * * * *